United States Patent [19]

Bachand

[11] 4,035,097
[45] July 12, 1977

[54] KNOCKDOWN CONNECTOR AND GUIDEWAY ASSEMBLY

[76] Inventor: Pierre Bachand, 11,725 Pavillon St., Apt. 3, Pierrefonds, Canada

[21] Appl. No.: 666,628

[22] Filed: Mar. 15, 1976

[30] Foreign Application Priority Data

Mar. 21, 1975 United Kingdom ............ 11838/75

[51] Int. Cl.² ........................................ F16D 39/00
[52] U.S. Cl. ............................. 403/348; 403/353; 151/41.71
[58] Field of Search ................... 151/41.71, 41.76; 85/1 H; 403/353, 348; 52/710, 711, 758 F

[56] References Cited

U.S. PATENT DOCUMENTS

| 1,210,595 | 1/1917 | Brubaker | 85/1 H |
|---|---|---|---|
| 1,747,496 | 2/1930 | Vanderveld | 211/184 |
| 2,448,213 | 8/1948 | Doonan | 85/1 H |
| 3,273,847 | 9/1966 | Berman | 248/243 |
| 3,589,525 | 6/1971 | Allen | 403/348 X |
| 3,604,369 | 9/1971 | Maslow | 108/144 |
| 3,654,879 | 4/1972 | Ferdinand | 108/110 |
| 3,826,207 | 7/1974 | Sutherlan | 108/108 |
| 3,908,330 | 9/1975 | Frach | 403/348 |

FOREIGN PATENT DOCUMENTS

| 2,033,040 | 1/1972 | Germany | 403/353 |
|---|---|---|---|
| 1,246,531 | 9/1971 | United Kingdom | 403/348 |

*Primary Examiner*—Andrew V. Kundrat

[57] ABSTRACT

A connector which may be readily assembled to and disassembled from a guideway, such as, in particular, a box-shaped channel, for the construction of knockdown furniture, shelving and the like. This knockdown connector is characterized by requiring only a standard box-shaped channel without special machining thereof. The knockdown connector and guideway assembly includes a box-shaped channel forming a U-shape transverse cross-section and having opposite internal faces, and a pair of flanges projecting edgewise toward each other. The knockdown connector includes an elongated base member having a pair of lugs at opposite ends thereof respectively; the central portion of the base member is formed with a threaded bore to removably screw a threaded holding member therein; and the lugs are formed with at least one camming face extending transversely to the longitudinal direction of the base member and operatively obliquely relative to at least one of the opposite internal faces.

8 Claims, 9 Drawing Figures

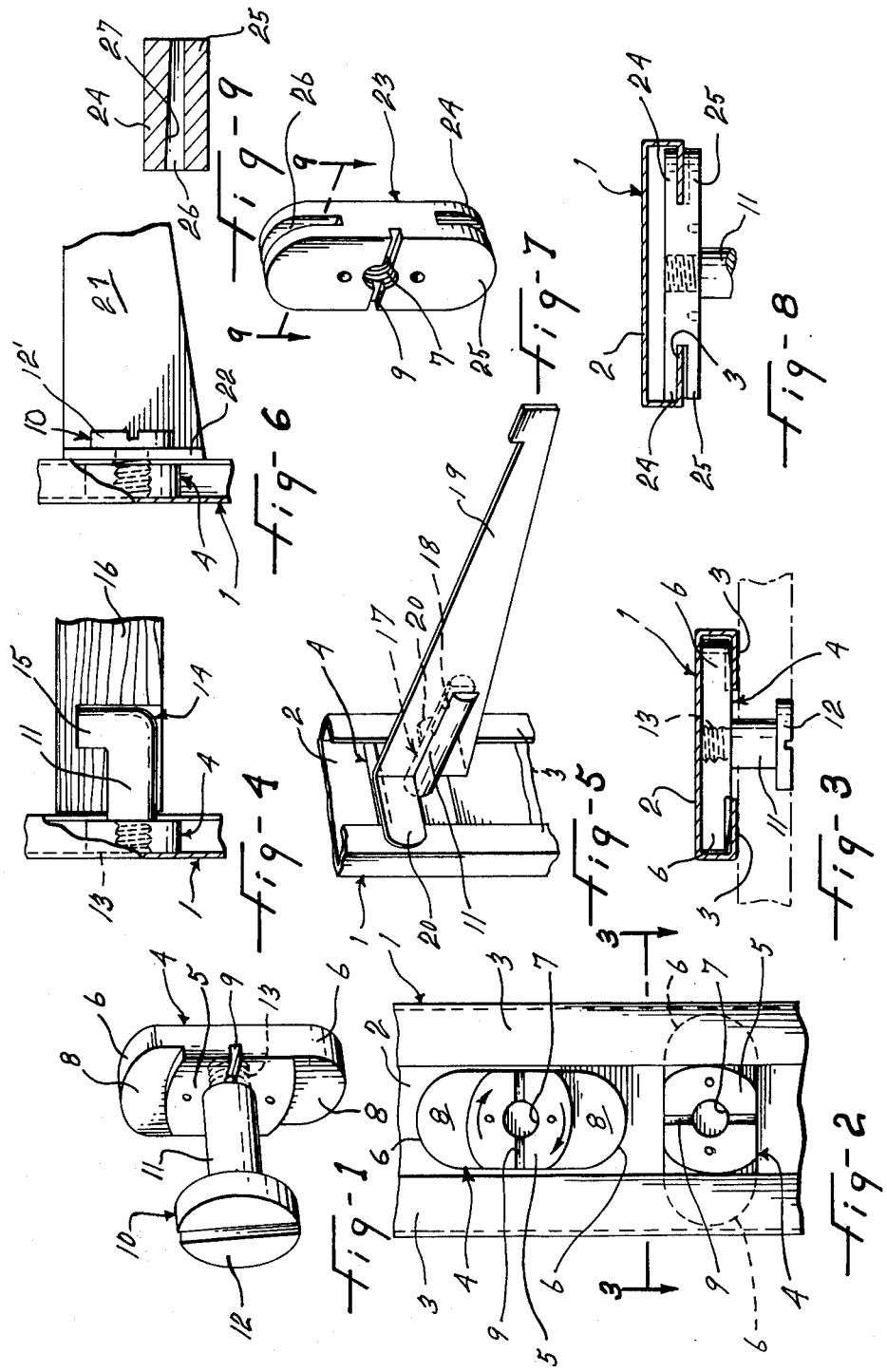

KNOCKDOWN CONNECTOR AND GUIDEWAY ASSEMBLY

This invention relates to a knockdown connector and structural assembly for the construction of furniture, shelving and the like and, more particularly, to a knockdown connector and guideway assembly of the type adapted for such construction.

So far, there have been proposed many concepts of knockdown connectors and guideway assemblies of the above type wherein a connector is removably secured to a guideway member or channel. However, in all of these preceding concepts, the guideway member or channel has to be machined specifically for the purpose of holding the corresponding connector member. Such machining implies labor and cost to accurately produce the desired guideway member or channel.

It is a general object of the present invention to provide a knockdown connector and guideway assembly of simple construction, easy and positive installation and competitive cost compared to now-existing alternatives.

It is a more specific object of the present invention to provide a knockdown connector and guideway assembly wherein the guideway is provided by a channel member of standard construction; that is, which needs no particular machining.

It is another object of the present invention to provide a knockdown connector and guideway assembly wherein the connector is adapted for use with different types of holding members, and consequently, is readily suited for different structural constructions, such as different pieces of furniture, shelving and the like.

The above and other objects and advantages of the present invention will be better understood with reference to the following detailed description of preferred embodiments thereof which are illustrated, by way of example only, in the accompanying drawings, in which:

FIG. 1 is a perspective view of a knockdown connector according to a first embodiment of the present invention;

FIG. 2 is a front view of a pair of knockdown connectors and a channel assembly according to the first embodiment of the preset invention;

FIG. 3 is a cross-sectional view of the knockdown connector and channel assembly as seen along line 3—3 in FIG. 2;

FIG. 4 is a side view of a knockdown connector according to the first embodiment of the invention but with a different holding member than in FIGS. 1, 2, and 3;

FIG. 5 is a perspective view of a knockdown connector and channel assembly according to the first embodiment of the present invention but with still another holding member;

FIG. 6 is a side view of a knockdown connector and channel assembly according to the first embodiment of the present invention but with still another holding member;

FIG. 7 is a perspective view of a knockdown connector according to a second embodiment of the present invention;

FIG. 8 is a side view of the knockdown connector of FIG. 7 in cooperation with a box-shaped channel; and FIG. 9 is a cross-sectional view of the knockdown connector as seen along line 9—9 in FIG. 7.

The knockdown connector and guideway assembly according to any embodiment of the present invention essentially includes a guideway or box-shaped channel 1 having a back wall 2, side walls and flanges 3 extending from the outer edges of the side walls towards each other, being separated by a slot of uniform width. The box-shaped channel has mutually facing internal faces arranged at a predetermined distance apart from each other and defined by inside faces of back wall 2 and of flanges 3.

In each embodiment of the present invention, the knockdown connector includes an elongated base member and a holding member. Different kinds of holding members may be used in any embodiment of the present invention, as will be explained later.

The elongated base member 4 according to the first embodiment of the present invention includes a central portion 5 intermediate the opposite end portions 6 thereof. The central portion 5 is formed with a threaded bore 7 extending centrally therein orthogonally to the longitudinal direction of the elongated base member 4 an opening at one main face of the latter.

A pair of camming surfaces 8 are formed on the end portions 6 respectively, on the same face of the base member 4 as the opening of the threaded bore 7. The camming surfaces 8 longitudinally extend transversely to the longitudinal direction of the base member 4 and they operatively extend obliquely relative to the above-mentioned internal faces of the channel 1. Thus, the end portions 6 taper from a thickness at least equal to the distance between the internal faces of the channel 1 to a thickness less than this distance. The opposite ends of the elongated base member 4 are rounded; the width of the base member 4 is less than the width of the slot between the flanges 3; and the length of the base member is less than the width of the guideway formed by the channel 1. Thus, the elongated base member may be aligned with the slot and pushed in against the internal face of the back wall 2. After, the base member may be rotated 90° for wedging engagement of the camming surfaces 8 against the internal face defined by the flanges 3. These two longitudinal and transverse alignment positions are illustrated by the upper and lower base members 4 respectively in FIG. 2. The lower base member in FIG. 2 is wedgingly locked in position and ready to support a structural element. The front face of the central portion 5 is formed with a screwdriver groove 9 to use a screwdriver for rotation of the base member.

A holding member, of any appropriate construction such as shown in FIGS. 1, 3, 4, 5, and 6, is screwed into the threaded bore 7 to secure a structural element to the corresponding base member 4. One holding member 10 according to the present invention constitutes a screw having a stem portion 11 and a slotted head 12 and a threaded portion 13 at opposite ends thereof respectively. The stem portion 11 is of larger diameter than the threaded end portion 13 to form an annular shoulder operatively abutting against the front face of the central portion 5.

Another holding member 14 according to the present invention constitutes a hook also having a stem portion 11, a threaded end portion 13 and an annular shoulder between these two portions. This holding member 14 distinctively includes a hook portion 15 projecting transversely from the stem portion 11 and at the opposite end thereof relative to the threaded end portion 13. The holding member 14 is thus adapted to hook into a hole or aperture in the bottom of a shelve 16 or other structural element.

A third holding member 17 according to the present invention is shown in FIG. 5 and also includes a stem portion 11, a threaded end portion, not shown, and an annular shoulder between these portions The end of the stem portion 11 opposite the threaded end portion is formed with a slot 18. A shelf carrying bracket 19 is axially inserted in the slot 18 in operative abutment against the flanges 3 by its tabs 20 projecting in laterally opposite directions from the main portion of the bracket.

As shown in FIG. 6, the holding member 10 in the form of a bolt secures a shelf bracket 21 by engagement of a laterally projecting flange 22 thereof.

A knockdown connector according to a second embodiment of the invention is shown in FIGS. 7, 8, and 9 and includes an elongated base member 23, also compatible with any of the afore-described holding members 10, 14, and 17.

The elongated base member 23 is shaped like the base member 4 relative to the width of the guideway and the width of the slot between the flanges 3 of the channel 1. In other words, this base member 23 has the same width, length and rounded end limitations relative to the channel 1 as the base member 4. The base member 23 also has a central portion provided with a threaded bore 7 and a screwdriver slot 9 on the front face thereof.

However, the elongated base member distinctively includes opposite flat front and rear faces and a pair of lugs 24 and 25 at each of the opposite ends thereof respectively. The two lugs 24 and 25 of each pair are spaced apart by a laterally tapering slot 26 defining an elongated camming surface 27. Each camming surface 27 longitudinally extends transversely to the longitudinal direction of the base member 23 and operatively obliquely relative to the above-mentioned internal face of the flanges 3.

As shown in FIG. 8, the base member 23 is only partially engaged in the slot of the channel 1, such that upon rotation thereof, the flanges 3 engage in the wider end of the two slots 26 and are finally wedgingly engaged between the lugs 24 and 25 at the narrower end of the slots 26.

It must be noted that any base member 4 or 23 may be installed either separately or with the selected holding member screwed thereon.

From FIGS. 5 and 6, it may be readily understood that shelving may be produced by operatively associating a plurality of upright channels 1 and the desired number of base members 4 or 23, holding elements or members 10, 14 or 17, shelf brackets 19 or 21, if required, and the corresponding shelves of specific construction, such as 16 or of plain construction.

Items of furniture may be provided by proper spatial arrangement of channels 1 or the like U-shape guideways, with knockdown connectors according to the present invention and with appropriate structural elements, such as panels, boards and the like.

It must be understood that other kinds of holding members are possible within the spirit and scope of the present invention as defined by the appended claims.

What I claim is:

1. A knockdown connector and guideway assembly wherein the guideway is a box-shaped channel having a bottom wall, side walls and co-planar flanges extending from the outer edges of said side walls towards each other and separated by a slot of uniform width extending longitudinally of said channel, the inside face of said bottom wall and the inside faces of said flanges being uniformly spaced apart transversely of the channel along the length of the latter, and wherein the connector includes an elongated flat base member and a holding member, said base member having a central portion and opposite end portions, means removably securing said holding member to the central portion of said base member, said base member having a width less than the width of said slot and a length less than the distance separating said side walls, one main face of said base member being flat, said base member insertable within said channel through said slot, when in a position aligned with the latter and with one main face flat against said back wall, said base member rotatable in said channel about an axis of rotation passing through said central portion and perpendicular to said one main face from said first-named position to a blocked position wherein said end portions are aligned transversely of said slot, the other main face of said member defining at each of said two opposite end portions, a camming face extending transversely of the elongated base member and obliquely to said one main face, the taper of said camming faces extending in the same direction along a circle co-axial with said axis of rotation, said end portions tapering transversely thereof from a thickness at least equal to the distance between the inside face of said bottom wall and the inside faces of said flanges to a thickness less than said lastnamed distance, said central portion having coupling menas formed on the face of said central portion opposite said flat main face and exposed through said slot, when said base member is located within said channel, said coupling means serving to couple the base member with a tool to rotate said base member between said two positions, said end portions wedgingly engaging the internal faces of said flanges in the blocked position of said base member, said holding member securable to said base member by said securing means once said base member is in said blocked position, said holding member serving to engage and support a structural element by means of said blocked base member in a predetermined position along said channel, the end portions of said base member being free from frictional engagement with said side walls in the blocked position of base member.

2. A knockdown connector and guideway assembly as claimed in claim 1, wherein said other main face of said central portion of the elongated base member is provided with a screwdriver slot, said slot constituting said coupling means to couple said base member to a tool.

3. A knockdown connector and guideway assembly as claimed in claim 1, wherein said means removably securing said holding member to the central portion of said base member include a threaded bore made in said central portion and opening at said other main face, said holding member having a threaded end removably screwed within said threaded bore.

4. A knockdown connector and guideway assembly as claimed in claim 3, wherein said coupling means include a screwdriver slot.

5. A knockdown connector and guideway assembly wherein the guideway is a box-shaped channel having a bottom wall, side walls and co-planar flanges extending from the outer edges of said side walls towards each other and separated by a slot of uniform width extending longitudinally of said channel, said flanges having a uniform thickness longitudinally of said channel, and wherein the connector includes an elongated base member having a central portion and two opposite end portions, said base member having a width less than the width of said slot and a length less than the distance separating said side walls, the opposite end portions of said base member being each formed with a slot extending longitudinally of the base member from the opposite ends thereof towards and terminating at said central portion, said slots being intermediate opposite main faces of said base member, said base member insertable between said flanges when in a position with said end portions in alignment with said channel and rotatable about a rotation axis passing through said central portion and perpendicular to said main faces of said base member from said first-named position to a blocked position in which said end portions are aligned transversely of said channel slot and the slots of said base member receive said flanges, each of the opposite slots of said base member tapering in the same direction along a circle co-axial with the axis of rotation of the base member, so that in said blocked position of said base member, said side flanges are wedgingly engaged in said opposite slots, said central portion of said base member having coupling means exposed through said channel slot to couple with a tool to rotate said base member between said two positions, said connector further including a holding member and means for removably securing said holding member to the central portion of said base member when said base member is in said blocked position along said channel, said holding member adapted to be secured to a structural element to be supported by the connector and guideway assembly.

6. A knockdown connector and guideway assembly as claimed in claim 5, wherein said coupling means consist of a screwdriver slot.

7. A knockdown connector and guideway assembly as claimed in claim 5, wherein said means to removably secure said holding member to said base member includes a threaded bore made in said central portion of said base member and opening at the main face of said central portion exposed through the slot of said channel, said holding member having a threaded end removably screwed within said threaded bore.

8. A knockdown connector and guideway assembly as claimed in claim 7, wherein said coupling means consist of a screwdriver slot.

* * * * *